US011770168B2

(12) United States Patent
Ding et al.

(10) Patent No.: US 11,770,168 B2
(45) Date of Patent: Sep. 26, 2023

(54) BEAM TRAINING FOR SIDELINK (SL) CONFIGURED WITH DISCONTINUOUS RECEPTION (DRX)

(71) Applicant: QUALCOMM Incorporated, San Diego, CA (US)

(72) Inventors: Ling Ding, Chester, NJ (US); Junyi Li, Franklin Park, NJ (US); Sony Akkarakaran, Poway, CA (US); Jung Ho Ryu, Fort Lee, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 17/162,784

(22) Filed: Jan. 29, 2021

(65) Prior Publication Data

US 2021/0273698 A1 Sep. 2, 2021

Related U.S. Application Data

(60) Provisional application No. 62/983,286, filed on Feb. 28, 2020.

(51) Int. Cl.
*H04B 7/06* (2006.01)
*H04B 7/0408* (2017.01)
*H04W 16/28* (2009.01)
*H04W 76/28* (2018.01)

(52) U.S. Cl.
CPC ......... *H04B 7/0617* (2013.01); *H04B 7/0408* (2013.01); *H04W 16/28* (2013.01); *H04W 76/28* (2018.02)

(58) Field of Classification Search
CPC ..... H04W 76/28; H04W 16/28; H04B 7/0617
USPC ......................................................... 370/329
See application file for complete search history.

(56) References Cited

U.S. PATENT DOCUMENTS

| 2017/0273062 A1 | 9/2017 | Liu et al. |
| 2018/0152985 A1* | 5/2018 | Agiwal ................. H04W 76/14 |
| 2019/0387572 A1* | 12/2019 | Nam ................. H04W 52/0235 |

FOREIGN PATENT DOCUMENTS

WO 2019032242 A1 2/2019

OTHER PUBLICATIONS

International Search Report and Written Opinion—PCT/US2021/016083—ISA/EPO—dated Apr. 21, 2021.

(Continued)

*Primary Examiner* — Sam K Ahn
*Assistant Examiner* — Gina M McKie
(74) *Attorney, Agent, or Firm* — Patterson + Sheridan, LLP

(57) ABSTRACT

Certain aspects provide a method for wireless communication by a first user-equipment (UE). The method generally includes applying a discontinuous reception (DRX) configuration for the first UE, monitoring for first signaling from a second UE indicating that the second UE has data to send to the first UE, the first signaling being transmitted using a plurality of transmit beams during a DRX cycle of the DRX configuration, selecting one or more transmit beams of the plurality of transmit beams based on the monitoring of the first signaling, and communicating in accordance with the selection.

20 Claims, 12 Drawing Sheets

(56) References Cited

OTHER PUBLICATIONS

Zhang Z., et al., "Fast Beam Tracking Discontinuous Reception for D2D-Based UAV MmWave Communication", IEEE Access, vol. 7, Aug. 9, 2019 (Aug. 9, 2019), pp. 110487-110498, XP011741655, DOI: 10.1109/ACCESS.2019.2934151 [retrieved on Aug. 19, 2019] Section II, figure 1, Section III.A, figure 2.

* cited by examiner

BEAM TRAINING FOR SIDELINK (SL) CONFIGURED WITH DISCONTINUOUS RECEPTION (DRX)

CROSS-REFERENCE TO RELATED APPLICATION

This application claims benefit of and priority to U.S. Provisional Application No. 62/983,286, filed Feb. 28, 2020, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for sidelink communication.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved discontinuous reception (DRX).

Certain aspects provide a method for wireless communication by a first user-equipment (UE). The method generally includes applying a DRX configuration for the first UE, monitoring for first signaling from a second UE indicating that the second UE has data to send to the first UE, the first signaling being transmitted using a plurality of transmit beams during a DRX cycle of the DRX configuration, selecting one or more transmit beams of the plurality of transmit beams based on the monitoring of the first signaling, and communicating in accordance with the selection.

Certain aspects provide a method for wireless communication by a first UE. The method generally includes transmitting first signaling to a second UE if the first UE has data to send to the second UE, the first signaling being transmitted using a plurality of transmit beams during a DRX cycle of a DRX configuration of the second UE, receiving an indication of one or more transmit beams of the plurality of transmit beams, and communicating in accordance with the received indication.

Certain aspects provide an apparatus for wireless communication by a first UE. The apparatus generally includes a memory, and one or more processors coupled to the memory, the memory and the one or more processors being configured to: apply a DRX configuration for the first UE; monitor for first signaling from a second UE indicating that the second UE has data to send to the first UE, the first signaling being transmitted using a plurality of transmit beams during a DRX cycle of the DRX configuration; select one or more transmit beams of the plurality of transmit beams based on the monitoring of the first signaling; and communicate in accordance with the selection.

Certain aspects provide an apparatus for wireless communication by a first UE. The apparatus generally includes a memory, and one or more processors coupled to the memory, the memory and the one or more processors being configured to: transmit first signaling to a second UE if the first UE has data to send to the second UE, the first signaling being transmitted using a plurality of transmit beams during a DRX cycle of a DRX configuration of the second UE; receive an indication of one or more transmit beams of the plurality of transmit beams; and communicate in accordance with the received indication.

Certain aspects provide an apparatus for wireless communication by a first UE. The method generally includes means for applying a DRX configuration for the first UE, monitoring for first signaling from a second UE indicating that the second UE has data to send to the first UE, the first signaling being transmitted using a plurality of transmit beams during a DRX cycle of the DRX configuration, means for selecting one or more transmit beams of the plurality of transmit beams based on the monitoring of the first signaling, and means for communicating in accordance with the selection.

Certain aspects provide a method for wireless communication by a first UE. The method generally includes means for transmitting first signaling to a second UE if the first UE has data to send to the second UE, the first signaling being transmitted using a plurality of transmit beams during a DRX cycle of a DRX configuration of the second UE, means for receiving an indication of one or more transmit beams of the plurality of transmit beams, and means for communicating in accordance with the received indication.

To the accomplishment of the foregoing and related ends, the one or more aspects comprise the features hereinafter fully described and particularly pointed out in the claims.

The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for sidelink (SL) beam training for SL configured with discontinuous reception (DRX). For example, during a DRX on phase, an "i want to send" signal (also referred to as an "IWTS") may be transmitted by a transmit UE to a receive UE, indicating to the receive that the transmit UE has data to send to the receive UE. In some aspects, the IWTS signal may be used for beam management. For example, the IWTS signal may be transmitted using different transmit beams and received using different receive beams, allowing a beam for communication between the transmit and receive UEs to be aligned.

The following description provides examples of configurations for SL communication in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
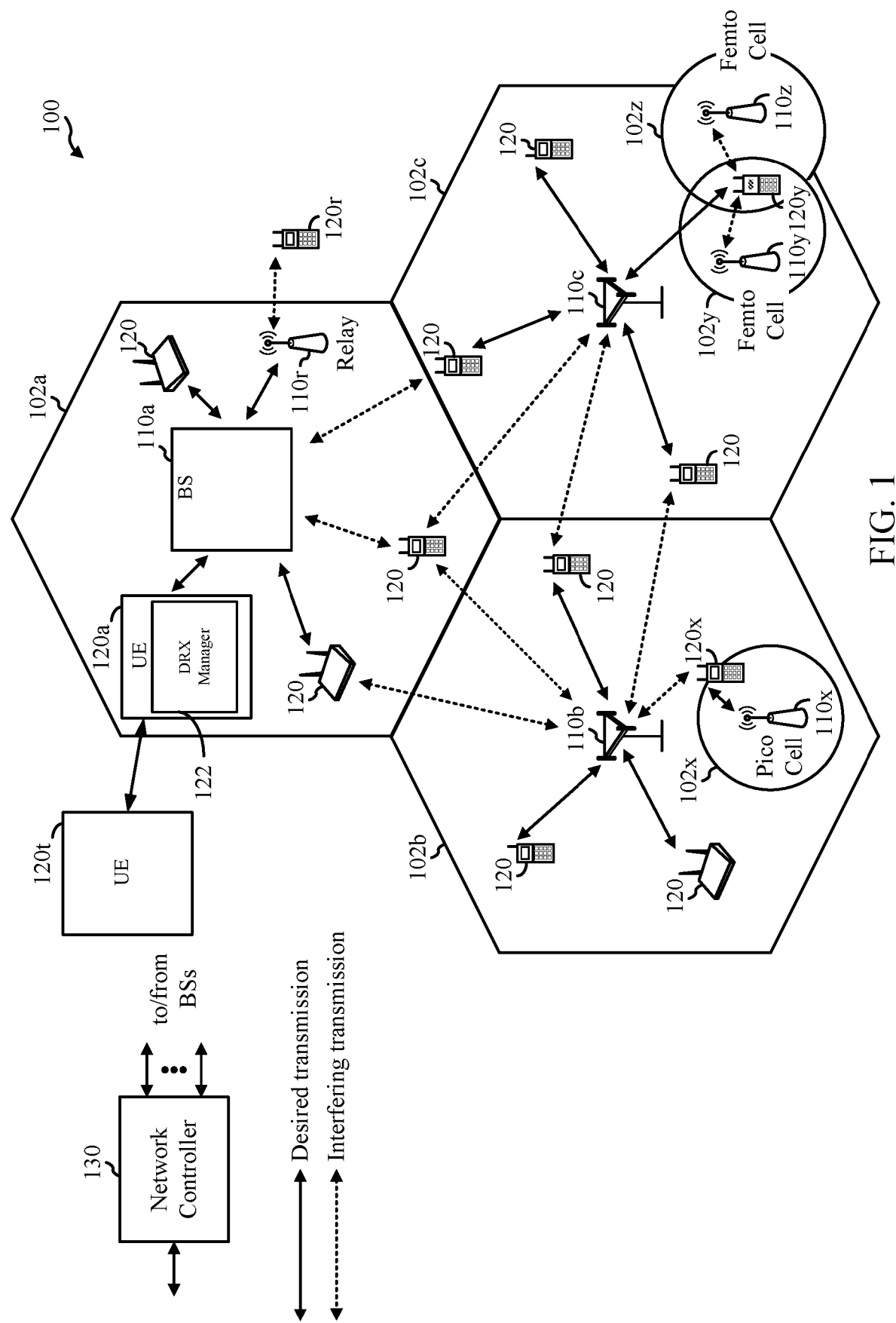
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the UEs 120 may be configured for beam training on a sidelink while in a discontinuous reception (DRX) mode of operations. As shown in FIG. 1, the UE 120a includes a DRX manager 122. The DRX manager 122 may be configured to transmitting and receiving signaling for beam management, as described in more detail herein.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
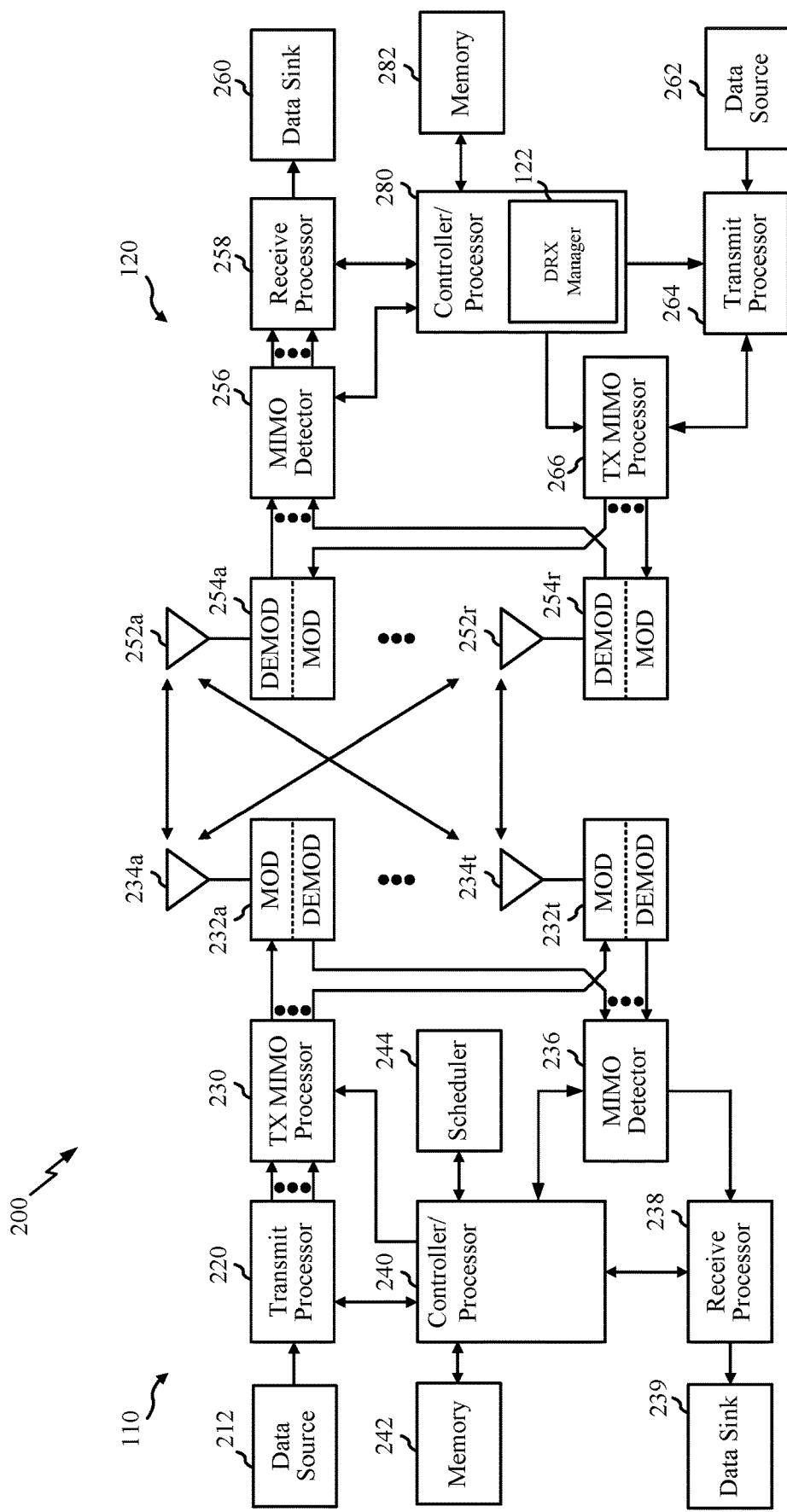
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the UE 120a may perform or direct the execution of processes for the techniques described herein. As shown in FIG. 2, the controller/processor 280 of the UE 120a has the DRX manager 122. Although shown at the Controller/Processor, other components of the UE 120a may be used performing the operations described herein.

Figure 3B:
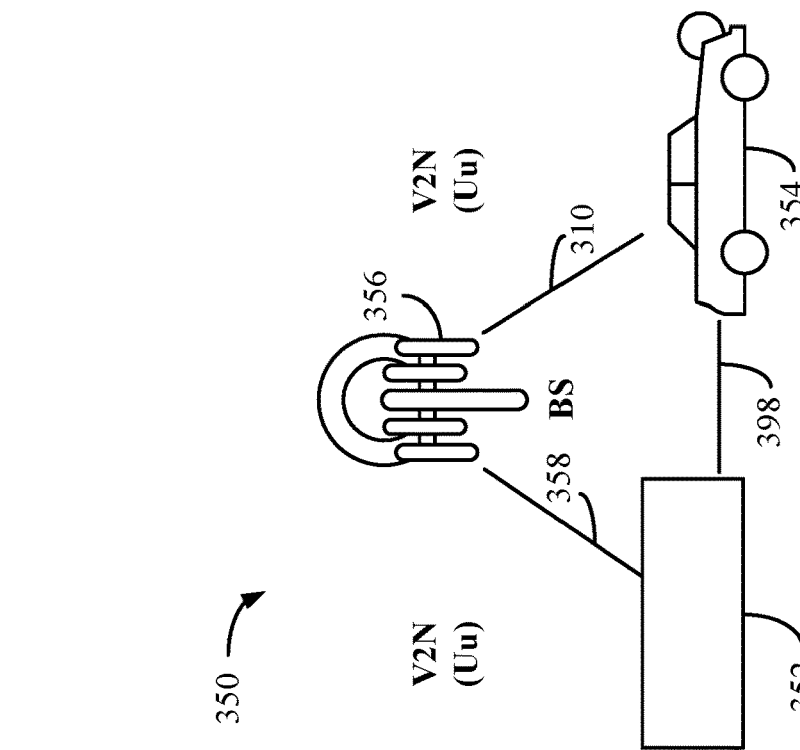
FIGS. 3A and 3B show diagrammatic representations of example vehicle to everything (V2X) systems in accordance with some aspects of the present disclosure.
Figure 3A:
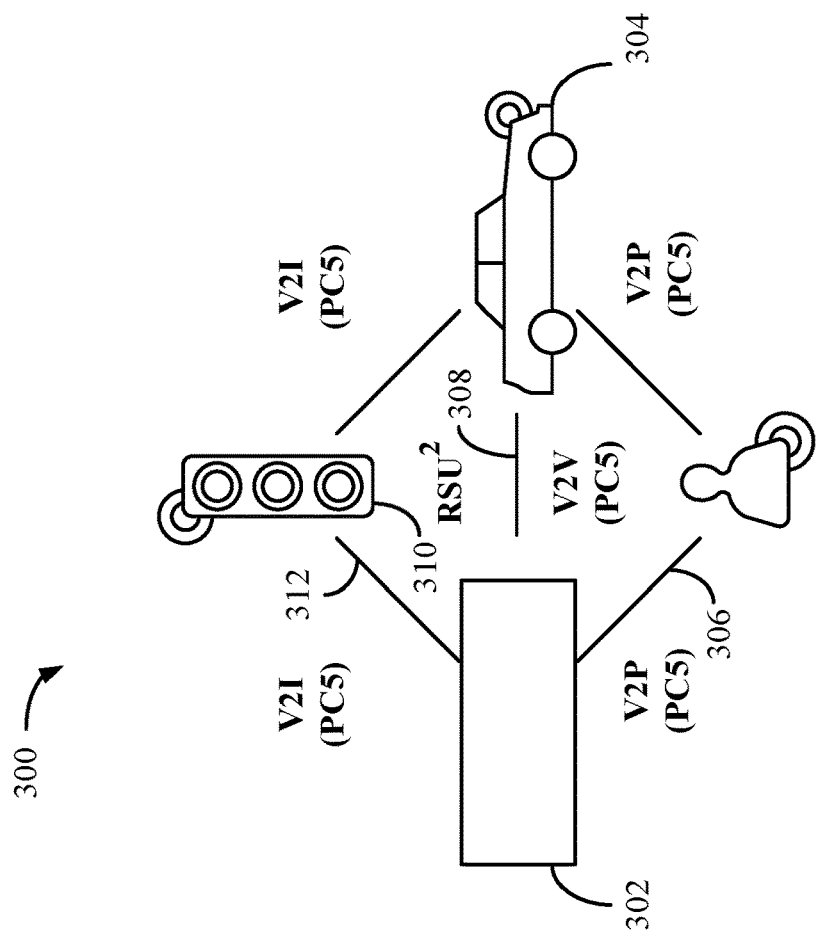

FIGS. 3A and 3B show diagrammatic representations of example vehicle to everything (V2X) systems in accordance with some aspects of the present disclosure. For example, the UEs shown in FIGS. 3A and 3B may communicate via sidelink channels and may perform sidelink CSI reporting as described herein.

The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE). As illustrated, UEs 352, 354 may communicate with each other using a sidelink (SL) 398.

Referring to FIG. 3A, a V2X system 300 (for example, including vehicle to vehicle (V2V) communications) is illustrated with two UEs 302, 304 (e.g., vehicles). The first transmission mode allows for direct communication between different participants in a given geographic location. As illustrated, a vehicle can have a wireless communication link 306 with an individual (V2P) (for example, via a UE) through a PC5 interface. Communications between the UEs 302 and 304 may also occur through a PC5 interface 308. In a like manner, communication may occur from a UE 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a UE 352 (e.g., vehicle) and a UE 354 (e.g., vehicle) through a network entity 356. These network communications may occur through discrete nodes, such as a base station (for example, an eNB or gNB), that sends and receives information to and from (for example, relays information between) UEs 352, 354. The network communications through vehicle to network (V2N) links (e.g., Uu links 358 and 310) may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

Example Techniques for Beam Training for Sidelink (SL) Configured with Discontinuous Reception (DRX)

In a discontinuous reception (DRX) mode of operation, a UE may go into a low power ("sleep") mode (also referred to herein as a "sleep phase"), which may also be referred to as a low power state, for a certain period of time (referred to as a DRX OFF period, phase, or duration) and wakes up again during a DRX ON (e.g., awake phase) period to check if there is any data to be received. The cycle of sleep and wake-up (DRX ON and DRX OFF) periods repeats over time, allowing the UE to save power while maintaining communication.

Figure 4:
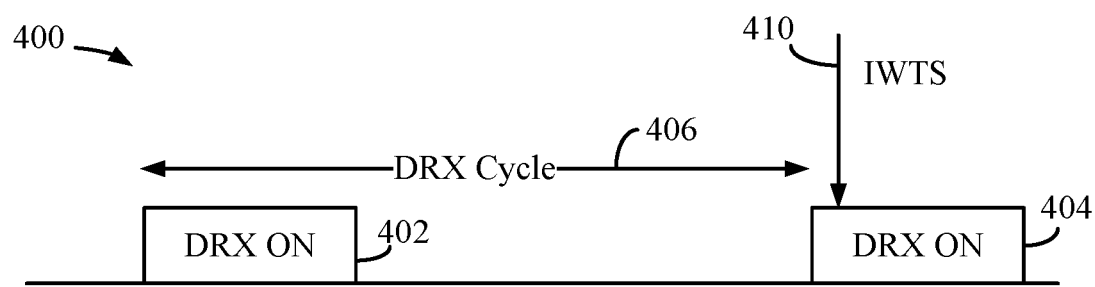
FIG. 4 illustrates an example discontinuous reception (DRX) configuration of a UE, in some aspects.

FIG. 4 illustrates an example DRX configuration 400 of a UE. As illustrated, the DRX configuration 400 may include DRX ON phases 402, 404. As described herein, a DRX ON phase repeats every DRX cycle. For example, the DRX ON phase 402 is during DRX cycle 406, as illustrated. The UE is awake during the DRX ON phases 402, 404 to monitor for signaling that may be received, and in a low power state (e.g., sleep phase) at other times (also referred to as DRX sleep phase). In some cases, multiple UEs in sidelink (SL) communication may be configured with DRX configuration. In some cases, beam sweeping may be performed to facilitate communication between the SL UEs. A UE transmitting signals for beam sweeping may be referred to as a transmit (TX) UE, and a UE receiving the signals may be referred to as a receive (RX) UE. For example, an RX UE may receive from a TX UE "I want to send" signaling (IWTS) 410 at a beginning of the DRX ON phase 410, indicating that TX UE has data to send. The IWTS may also be used for beam management, as described in more detail herein.

After a DRX sleep phase of a RX UE, beams between a TX UE and a RX UE may be out of date. Certain aspects of the present disclosure provide techniques for beam management during a DRX ON phase of a DRX configuration, given that there may be multiple SL UEs communicating with one SL UE. Beam management or sweeping may be performed during DRX ON phase to resolve the beam misalignment between a TX UE and a RX UE.

For a Uu link, a UE communicates with a base station (BS) and has one DRX setting (e.g., the DRX setting with the BS). However, for SL, the UE may be in communication with multiple UEs and may have multiple DRX settings (e.g., one DRX setting per UE pair). Certain aspects provide are directed to aligning the DRX ON durations of the UEs in SL communication.

In some aspects, DRX ON phases may be aligned over different TX UEs in a time-orthogonal manner. For a given RX UE, there may be only one TX UE at one DRX ON phase, and beam management/sweeping may be performed independently over different TX UEs (e.g., beam sweeping may be performed for UE pairs one at a time). This may be similar to beam management on the Uu link. However, this option for SL is costly from a power consumption and processing power viewpoints because there may be multiple SL UEs communicating with one SL UE. Moreover, the likelihood of a TX UE contacting a RX UE may be relatively low during any given DRX ON phase.

Another option is for a RX UE to use the same DRX setting (including the same DRX ON) as the TX UEs. In certain aspects of the present disclosure, the DRX ON phases may be overlapping in time over all the TX UE-RX UE pairs, and beam management/sweeping may be performed one time for all TX UEs. Certain aspects provide techniques for handling scenarios where more than one TX UE contacts a RX UE during the same DRX ON phase of the RX UE.

Figure 5:
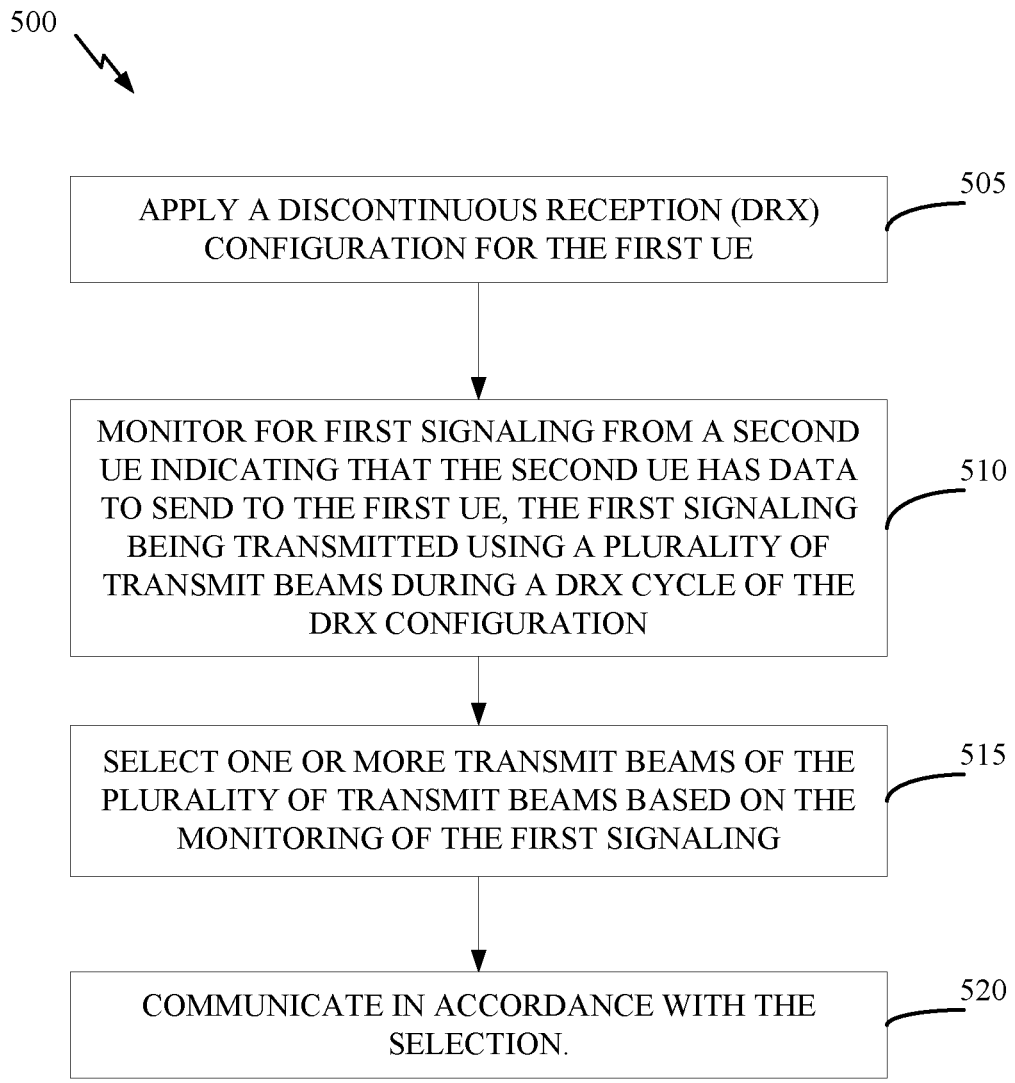
FIG. 5 is a flow diagram illustrating example operations for wireless communication, in accordance with certain aspects of the present disclosure.

FIG. 5 is a flow diagram illustrating example operations 500 for wireless communication, in accordance with certain aspects of the present disclosure. The operations 500 may be performed, for example, by a first UE (e.g., such as a UE 120a in the wireless communication network 100). The first UE with respect to the operations 500 may be referred to as a Rx UE.

Operations 500 may be implemented as software components that are executed and run on one or more processors (e.g., controller/processor 280 of FIG. 2). Further, the transmission and reception of signals by the UE in operations 500 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 500 may begin, at block 505, with the first UE applying a DRX configuration for the first UE, and at block 510, monitoring for first signaling (also referred to herein as "I want to send" signaling (IWTS)) from a second UE indicating that the second UE has data to send to the first UE, the first signaling being transmitted using a plurality of transmit beams during a DRX cycle of the DRX configuration. At block 515, the first UE may select one or more transmit beams of the plurality of transmit beams based on the monitoring of the first signaling, and at block 520, communicate in accordance with the selection. For example, the first UE may send second signaling (e.g., IWTS) to the second UE in accordance with the selection.

Figure 6:
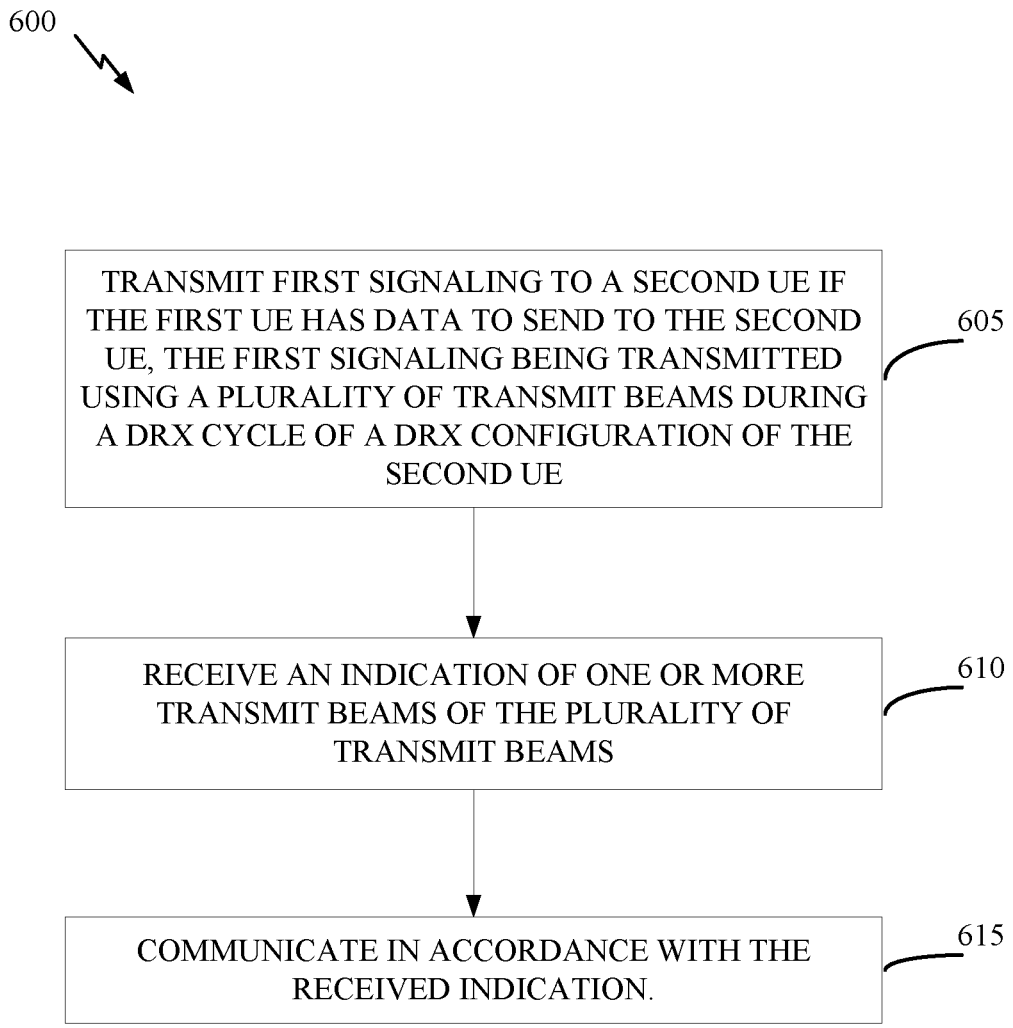
FIG. 6 is a flow diagram illustrating example operations for wireless communication, in accordance with certain aspects of the present disclosure.

FIG. 6 is a flow diagram illustrating example operations 600 for wireless communication, in accordance with certain aspects of the present disclosure. The operations 600 may be performed, for example, by a first UE (e.g., such as a UE 120t in the wireless communication network 100). The first UE with respect to the operations 600 may be referred to as a Tx UE.

Operations 600 may be implemented as software components that are executed and run on one or more processors (e.g., controller/processor 280 of FIG. 2). Further, the transmission and reception of signals by the first UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 605, by the first UE transmitting first signaling to a second UE if the first UE has data to send to the second UE, the first signaling (also referred to herein as "I want to send" signaling (IWTS)) being transmitted using a plurality of transmit beams during a DRX cycle of a DRX configuration of the second UE. At block 610, the first UE may be receive an indication of one or more transmit beams of the plurality of transmit beams, and at block 615, communicate in accordance with the received indication.

In other words, if a SL TX UE has data to send to a SL RX UE, at the beginning of a DRX ON duration of the Rx UE (e.g., DRX ON phase 402), the TX UE sweeps beams over all directions and transmits a "I want to send" signal or signaling (IWTS) over each direction. The DRX configuration of the SL RX UE may be the same and known to all SL TX UEs via configuration. The IWTS is sent during a beam management/beam sweeping phase that is performed during an RX UE's DRX ON phase. The TX UE may be awake during the RX UE's DRX ON phase if it has data to send to the RX UE.

The IWTS may be designed as one single known sequence or a set of known sequences, from the RX UE viewpoint. For example, a TX UE may be in communication with multiple RX UEs. Thus, the TX UE may use different sequences when transmitting IWTS to the different RX UEs. For example, IWTS to a first RX UE may identify the UE pair for the TX UE and the first RX UE, and IWTS to a second RX UE may identify the UE pair for the TX UE and the second RX UE. In this manner, the IWTS is RX centric. In other words, a known sequence may be used for IWTS to identify the RX UE or the TX UE-RX UE pair, and the IWTS may be sent during the RX UE's DRX ON phase. The IWTS may be sent only when a TX UE has data to send to a RX UE, for which beam management is be performed.

The IWTS may be a quick paging message that is also used for beam management. The IWTS may be designed as a wide-band or a narrow-band signal. If transmitted as a wide-band signal, the IWTS may be better suited for beam management since a frequency selective channel may span the entirety of the bandwidth of the channel (or at least the entire bandwidth of a component carrier (CC) on a channel). However, transmitting the IWTS using a narrow-band signal may be better in terms of UE power saving. The IWTS may be similar to Uu link beam sweeping during a random access channel (RACH). One example difference may be that the beam-tracking sequence of the IWTS may be lighter than Uu link beam-tracking sequence, such as a synchronization signal block (SSB), and the beam management protocol may involve fewer steps.

Figure 7A:
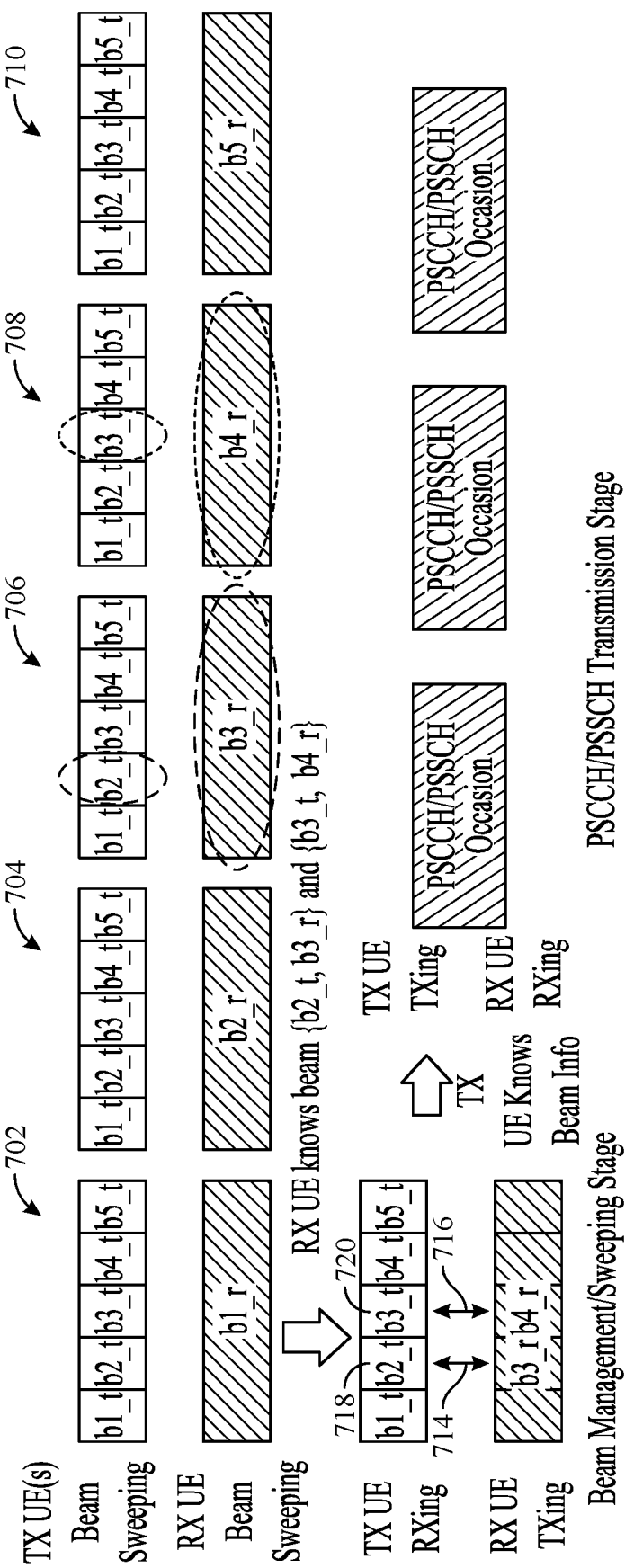
FIGS. 7A, 7B, 7C, 7D illustrate example techniques for beam management, in accordance with certain aspects of the present disclosure.

FIGS. 7A, 7B, 7C, 7D illustrate example techniques for beam management, in accordance with certain aspects of the present disclosure. As illustrated in FIG. 7A, a TX UE may transmit the IWTS using a sweep of transmit beams b1_t, b2_t, b3_t, b4_t, and b5_t during each of the beam management occasions 702, 704, 706, 708, 710. During each of the beam management occasions 702, 704, 706, 708, 710, the UE may monitor for the IWTS using one of receive beams b1_r, b2_r, b3_r, b4_r, and b5_r, as illustrated. For example, the UE may receive the IWTS (e.g., with an energy level above a threshold) transmitted using transmit beam b2_t via receive beams b3_r during transmission occasion 706, and also receive the IWTS as transmitted via transmit beam b3_t via receive beam b4_r during transmission occasion 708.

During a following beam management occasion 712, the Rx UE may transmit IWTS 714 using a transmit beam corresponding to the receive beam b3_r, and transmit IWTS 716 using a transmit beam corresponding to the receive beam b4_r. For example, the IWTS 714 may be sent during a transmission occasion 718 configured for the transmit beam b2_t, and the IWTS 716 may be transmitted during the transmission occasion 720 configured for the transmit beam b3_t. Thus, the TX UE receiving the IWTS 714 and 716 knows that transmit beams b2_t and b3_t are to be used for communication (e.g., are the ones successfully received by the Rx UE).

Figure 7B:
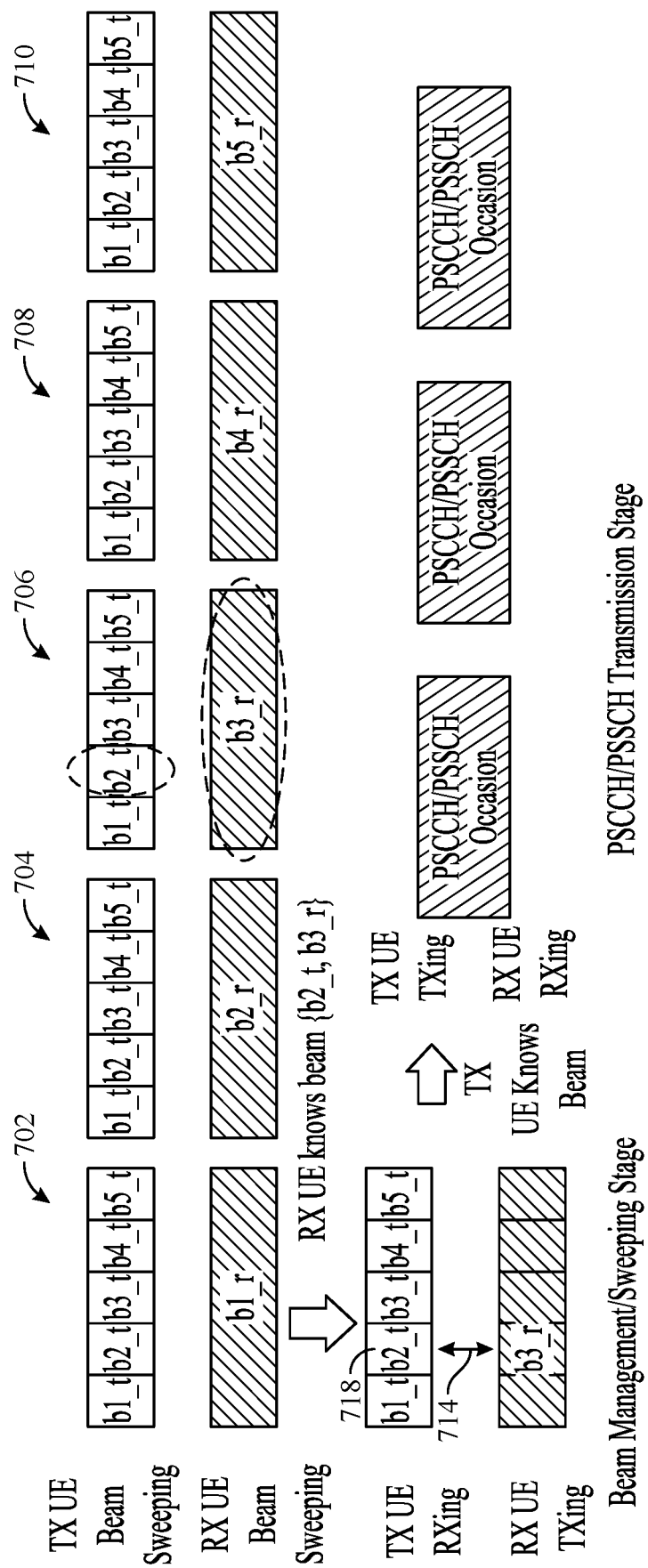

As illustrated in FIG. 7B, the UE may only receive IWTS transmitted via transmit beam b2_t via receive beam b3_r. Thus, the RX UE may transmit IWTS 714, as illustrated. In other words, the transmission of IWTS by the RX UE serves as an indication to the TX UE of the beams to be used for communication. As illustrated, a physical sidelink control channel (PSCCH) and/or physical sidelink shared channel (PSSCH) transmission stage may follow the beam management/sweeping stage.

In certain aspects, the RX UE monitors for the IWTS by sweeping its receive beams at the beginning of each of its DRX ON phases, trying to receive IWTS from one or more TX UEs. In some scenarios, more than one SL TX UE may transmit IWTS during the same DRX ON duration of the RX UE. Certain aspects provide techniques for handling scenarios where more than one TX UE contacts a RX UE during the same DRX ON duration.

Figure 8A:
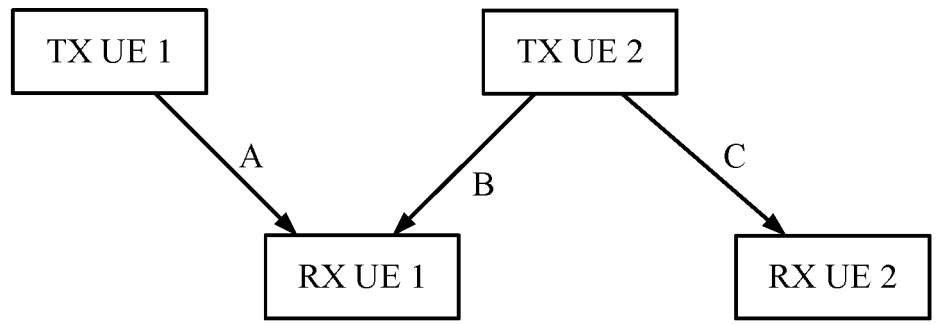
FIGS. 8A and 8B illustrate example sequence configurations for beam management, in accordance with certain aspects of the present disclosure
Figure 8B:
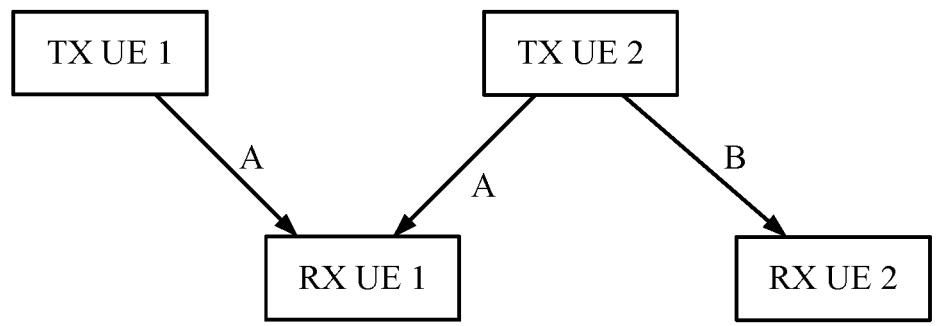

FIGS. 8A and 8B illustrate IWTS sequence configurations, in accordance with certain aspects of the present disclosure. In certain aspects, the IWTS may include a set of known sequences, each of the known sequences uniquely identifying one TX-RX UE pair. For example, as illustrated in FIG. 8A, multiple TX UEs (TX UE 1 and TX UE 2) may be in communication with multiple RX UEs. As illustrated, each RX-TX UE pair may use a different one of sequences A, B, and C. In this case, the RX UE may detect which TX UE(s) is transmitting during a beam management/sweeping stage, no matter whether one or more than one TX UE is transmitting during the same DRX ON duration or not, as long as there is no collision.

Figure 7C:
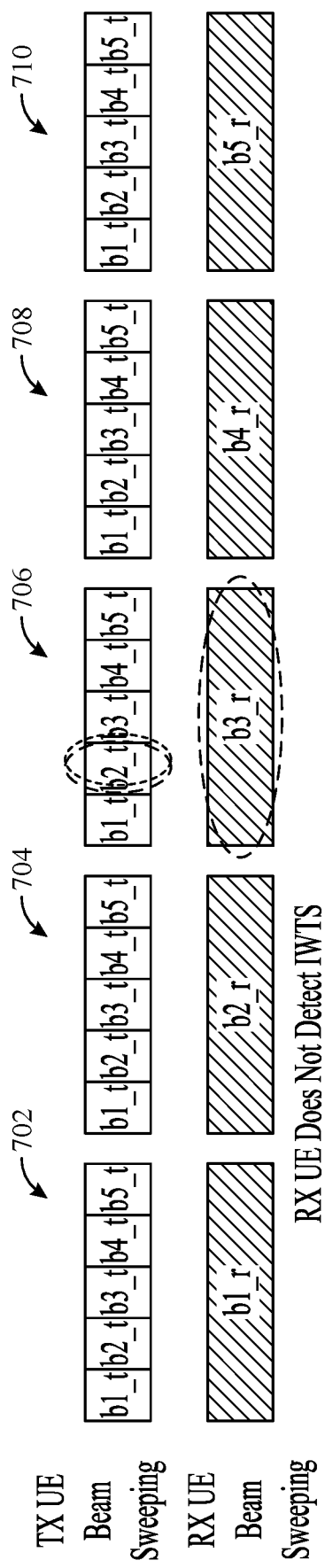

Collision may occur during beam management/sweeping stage, as illustrated in FIG. 7C. Collision generally refers to more than one TX UE transmitting during the same DRX ON duration and RX UE being unable to detect the IWTS. For example, multiple TX UEs may be transmitting IWTS during the beam management occasions 702, 704, 706, 708, and 710. The IWTS transmitted by the TX UEs using transmit beam b2_t may, if detected, be received by the RX UE via receive beam b3_t. But since the IWTS is transmitted by both TX UEs at the same time and use different sequences, the RX UE may be unable to detect the IWTS, referred to as a collision. However, if the IWTS transmitted by the different TX UEs are received at different times, no collision may occur. For example, as described with respect to FIG. 7A, an IWTS may be received during beam management occasion 706 from one TX UE, and an IWTS may be received during beam management occasion 708 from another TX UE. The RX UE is able to detect the IWTS and differentiate which of the TX UEs is transmitting the IWTS in the beam management occasions 706, 708 if different sequences are used. However, the SL RX UE has to monitor multiple known sequences, which may be costly with respect to processing power.

Figure 7D:
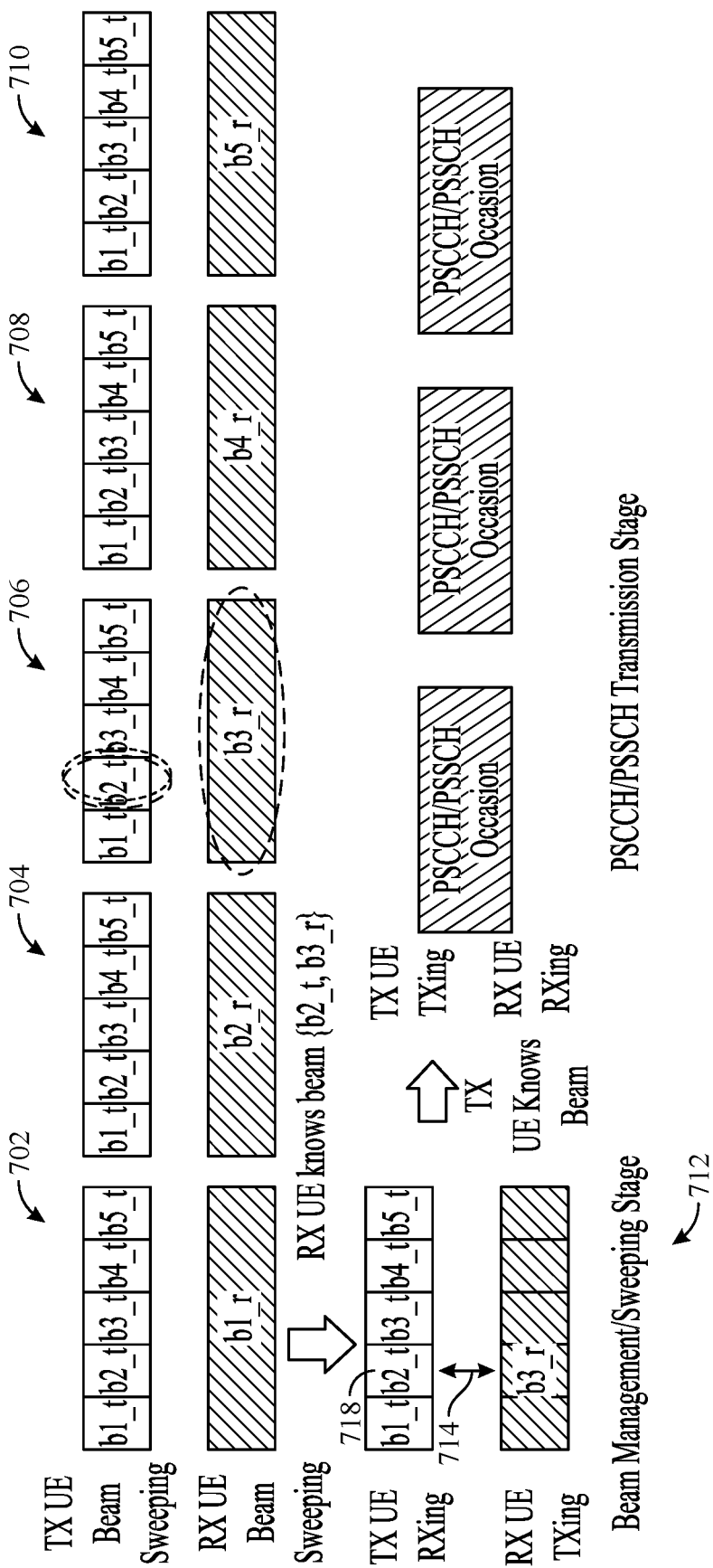

In certain aspects, one single known sequence per RX UE may be used for all the TX UEs that communicate with the RX UE. For example, as illustrated in FIG. 8B, multiple TX UEs (TX UE 1 and TX UE 2) may be in communication with multiple RX UEs. As illustrated, TX UE 1 and TX UE 2 may use the same sequence A for IWTS transmitted to RX UE 1. However, TX UE 2 may use a sequence B for IWTS to RX UE 2. In this case, an RX UE may not be able to determine which TX UE(s) transmitted a detected IWTS. Thus, in certain aspects, an identifier (ID) of a TX UE may be included in PSCCH or PSSCH transmitted during the PSCCH/PSSCH transmission stage. Moreover, as illustrated in FIG. 7D, even if two TX UEs transmit IWTS at the same time, no collision may occur since the sequence of the IWTS transmissions is the same. In other words, the IWTS 714 may be sent during a transmission occasion 718 configured for the transmit beam b2_t, and received via receive beam b3_r, as illustrated. Thus, the Rx UE may know that one or more TX UEs have transmitted IWTS using beam b2_t during transmission occasion 706, but may be unable to identify the one or more TX UEs during the beam sweeping phase.

In such a case, a collision may still occur during the PSCCH/PSSCH transmission stage since PSCCH/PSSCH from different TX UEs differ. To reduce the likelihood (probability) of collision during the PSCCH/PSSCH transmission stage, a SL TX UE may randomly select the PSCCH/PSSCH occasions to be used for data transmission. Although collision may not occur during beam management/sweeping stage, collision may occur during PSCCH/PSSCH transmission stage if more than one TX UE transmits during the same DRX ON phase of the RX UE, even though PSCCH/PSSCH occasions are randomly selected.

When multiple UEs are transmitting IWTS to an RX UE, and the RX UE detects IWTS transmitted using different transmit beams and/or received via different receive beams (e.g., as illustrated in FIG. 7A), the different IWTS transmissions may either be from different TX UEs, or from the same TX UE but associated with different signal paths (e.g., due to reflection). If the sequence of the IWTS transmissions from the different TX UEs are the same, the RX UE is able to determine whether the different IWTS transmissions are from different TX UEs, or from the same TX UE but associated with different signal paths. However, if the same sequence is used for the IWTS transmissions from the different TX UEs, the RX UE is unable to determine whether the different IWTS transmissions are from different TX UEs, or from the same TX UE but associated with different signal paths.

When multiple UEs are transmitting IWTS to an RX UE, and the RX UE detects IWTS transmitted using a single transmit beam and received via a single receive beam, the UE is able to detect the IWTS only if the same sequence is used for the IWTS transmissions, as described with respect to FIG. 7D and FIG. 9B. Thus, if different sequences are used and the UE detects IWTS transmitted using a single transmit beam and received via a single receive beam, the RX UE may determine (e.g., assume) that the IWTS transmission that is detected is from a single TX UE and may know the ID of the TX UE based on the sequence of the IWTS. If the same sequence is used for the IWTS transmissions, the RX UE may determine that the IWTS transmission that is detected is from a single TX UE, but may be unable to determine which TX UE the IWTS transmission is from. Thus, as described herein, the ID of the TX UE may be included in PSCCH or PSSCH during the PSCCH/PSSCH transmission stage.

In certain aspects, when a RX UE sweeps its beams at beginnings of its DRX ON durations, the RX UE may first use the RX beam(s) used before its DRX sleep (e.g., the Rx UE may use a receive beam used to receive signaling during the DRX cycle 406, when monitoring for IWTS during the DRX ON phase 404) and/or the RX UE may first use a broad beam to receive IWTS, and proceed to use narrow beams if IWTS is not received using the broad beam. To do so, TX UE(s) may need to be configured to know the beam sweeping procedure of the RX UE (e.g., the time duration(s) during which the RX UE is using the receive beam used before the RX UE's DRX sleep phase, and/or the time duration(s) when the RX UE is using the broad beam and narrow beams). The beam management/beam sweeping via IWTS, as described herein, may be implemented so long as an RX UE has DRX configured, while one or more TX UEs (communicating with the RX UE) may or may not be configured with DRX.

Figure 9:
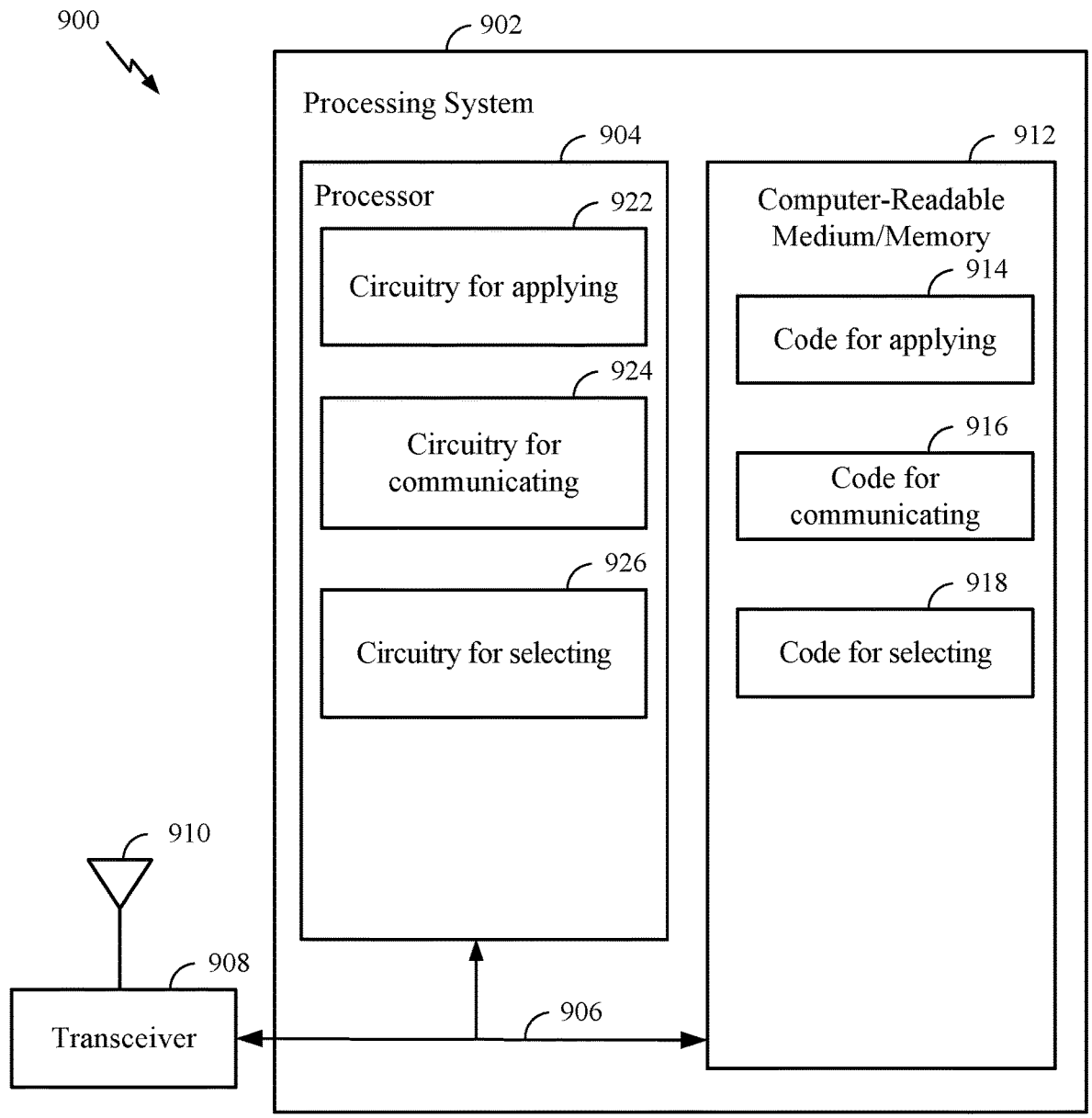
FIG. 9 illustrates a communications device that may include various components configured to perform operations for the techniques disclosed herein.

FIG. 9 illustrates a communications device 900 that may include various components (e.g., corresponding to means-plus-function components) configured to perform operations for the techniques disclosed herein, such as the operations illustrated in FIGS. 5 and 6. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 5 and 6. In certain aspects, computer-readable medium/memory 912 stores code 914 for applying; code 916 for communicating (e.g., monitoring, receiving, or transmitting), and code 918 for selecting. In certain aspects, the processor 904 has circuitry configured to implement the code stored in the computer-readable medium/memory 912. The processor 904 includes circuitry 922 for applying; circuitry 924 for communicating (e.g., monitoring, receiving, or transmitting); and circuitry 926 for selecting.

Example Aspects

Aspect 1. A method for wireless communication by a first user-equipment (UE), comprising: applying a discontinuous reception (DRX) configuration for the first UE; monitoring for first signaling from a second UE indicating that the second UE has data to send to the first UE, the first signaling being transmitted using a plurality of transmit beams during a DRX cycle of the DRX configuration; selecting one or more transmit beams of the plurality of transmit beams based on the monitoring of the first signaling; and communicating in accordance with the selection.

Aspect 2. The method of aspect 1, wherein the first signaling transmitted using each of the plurality of transmit beams is monitored for using one of a plurality of receive beams.

Aspect 3. The method of any one of aspects 1-2, wherein the first signaling is transmitted during a beginning of an awake phase of the DRX cycle.

Aspect 4. The method of any one of aspects 1-3, wherein: the first signaling is transmitted by the second UE and a third UE; the first signaling transmitted from the second UE comprises a sequence indicating an identifier (ID) associated with the first UE and the second UE; and the first signaling transmitted from the third UE comprises a sequence indicating an ID associated with the first UE and the third UE.

Aspect 5. The method of any one of aspects 1-4, wherein: the first signaling is transmitted by the second UE and a third UE; and the first signaling transmitted from the second UE and the third UE comprise the same sequence identifying the first UE.

Aspect 6. The method of any one of aspects 1-5, further comprising: receiving, via a first receive beam, the first signaling transmitted using a first transmit beam of the plurality of transmit beams; and transmitting second signaling via a transmit beam corresponding to the first receive beam, the second signaling being transmitted during a transmission occasion configured for the first transmit beam, wherein the communication is based on the first receive beam.

Aspect 7. The method of aspect 6, wherein the communicating comprises communicating on sidelink channels with the second UE and a third UE based on the first transmit beam and the first receive beam, wherein transmission occasions of the sidelink channels are randomly selected.

Aspect 8. The method of any one of aspects 6-7, wherein the communicating comprises communicating on a first sidelink channel with the second UE and on a second sidelink channel with a third UE, the first sidelink channel and the second sidelink channel identifying the second UE and the third UE, respectively.

Aspect 9. The method of any one of aspects 1-8, further comprising: receiving, via a first receive beam, the first signaling transmitted using a first transmit beam of the plurality of transmit beams; receiving, via a second receive beam, the first signaling transmitted using a second transmit beam of the plurality of transmit beams; transmitting second signaling via a transmit beam corresponding to the first receive beam and during a transmission occasion configured for the first transmit beam; and transmitting third signaling via a transmit beam corresponding to the second receive beam and during a transmission occasion configured for the second transmit beam.

Aspect 10. The method of aspect 9, wherein: the first signaling is transmitted by the second UE and a third UE; the first signaling received via the first receive beam is transmitted by the second UE and comprises a sequence indicating an ID associated with the first UE and the second UE; and the first signaling received via the second receive beam is transmitted by the third UE and comprises a sequence indicating an ID associated with the first UE and the third UE.

Aspect 11. The method of aspect 10, further comprising: communicating with the second UE based on the first receive beam; and communicating with the third UE based on the second receive beam.

Aspect 12. The method of any one of aspects 9-11, wherein: the first signaling is transmitted by the second UE and a third UE; and the first signaling transmitted from the second UE and the third UE comprise the same sequence.

Aspect 13. The method of any one of aspects 1-12, wherein the first signaling is monitored for during a first DRX cycle of the DRX configuration, and wherein the first signaling is monitored via a receive beam used to receive signals during a previous DRX cycle of the DRX configuration.

Aspect 14. The method of any one of aspects 1-13, wherein monitoring for the first signaling comprises: monitoring for the first signaling using a broad beam; and monitoring for the first signaling using a narrow beam if the first signaling is not received while monitoring using the broad beam.

Aspect 15. A method for wireless communication by a first user-equipment (UE), comprising: transmitting first signaling to a second UE if the first UE has data to send to the second UE, the first signaling being transmitted using a plurality of transmit beams during a DRX cycle of a DRX configuration of the second UE; receiving an indication of one or more transmit beams of the plurality of transmit beams; and communicating in accordance with the received indication.

Aspect 16. The method of aspect 15, wherein the first signaling transmitted using each of the plurality of transmit beams is monitored for by the second UE using one of a plurality of receive beams.

Aspect 17. The method of any one of aspects 15-16, wherein the first signaling is transmitted during a beginning of an awake phase of the DRX cycle of the second UE.

Aspect 18. The method of any one of aspects 15-17, wherein: the first signaling is transmitted to the second UE and a third UE; the first signaling transmitted to the second UE comprises a sequence indicating an identifier (ID) associated with the first UE and the second UE; and the first signaling transmitted to the third UE comprises a sequence indicating an ID associated with the first UE and the third UE.

Aspect 19. The method of any one of aspects 15-18, further comprising transmitting the first signaling using a first transmit beam of the plurality of transmitted beams, wherein receiving the indication of the one or more transmit beams comprises receiving second signaling via a receive beam corresponding to the first transmit beam, wherein the communication is based on the first transmit beam.

Aspect 20. The method of aspect 19, further comprising randomly selecting transmission occasions to be used for the communication on sidelink channels with the second UE based on the first transmit beam.

Aspect 21. The method of any one of aspects 19-20, wherein the communicating comprises communicating on a first sidelink channel with the second UE, the first sidelink channel identifying the first UE.

Aspect 22. The method of any one of aspects 15-21, further comprising: transmitting the first signaling using a first transmit beam of the plurality of transmit beams; and transmitting the first signaling using a second transmit beam of the plurality of transmit beams, wherein receiving the indication of the one or more transmit beams comprises: receiving second signaling via a receive beam corresponding to the first transmit beam; and receiving the second signaling via a receive beam corresponding to the second transmit beam.

Aspect 23. The method of aspect 22, wherein: the first signaling is transmitted to the second UE and a third UE; the first signaling transmitted via the first transmit beam is transmitted to the second UE and comprises a sequence indicating an ID associated with the first UE and the second UE; and the first signaling transmitted via the second transmit beam is transmitted to the third UE and comprises a sequence indicating an ID associated with the first UE and the third UE.

Aspect 24. The method of aspect 23, further comprising: communicating with the second UE based on the first transmit beam; and communicating with the third UE based on the second transmit beam.

Aspect 25. An apparatus comprising means for performing the method of any of aspects 1 through 24.

Aspect 26. An apparatus comprising at least one processor and a memory coupled to the at least one processor, the memory and the at least one processor being configured to perform the method of any of aspects 1 through 24.

Aspect 27. A computer readable medium storing computer executable code thereon for wireless communications that, when executed by at least one processor, cause an apparatus to perform the method of any of aspects 1 through 24.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication by a first user-equipment (UE), comprising:
   applying a discontinuous reception (DRX) configuration for the first UE;
   monitoring for first signaling from a second UE indicating that the second UE has data to send to the first UE, the first signaling being transmitted using a plurality of transmit beams during a DRX cycle of the DRX configuration;
   selecting one or more transmit beams of the plurality of transmit beams based on the monitoring of the first signaling; and
   communicating in accordance with the selection, wherein:
      the first signaling is transmitted by the second UE and a third UE;
      the first signaling transmitted from the second UE comprises a sequence indicating an identifier (ID) associated with the first UE and the second UE; and
      the first signaling transmitted from the third UE comprises a sequence indicating an ID associated with the first UE and the third UE.

2. The method of claim 1, wherein the first signaling transmitted using each of the plurality of transmit beams is monitored for using one of a plurality of receive beams.

3. The method of claim 1, wherein the first signaling is transmitted during a beginning of an awake phase of the DRX cycle.

4. The method of claim 1, further comprising:
   receiving, via a first receive beam, the first signaling transmitted using a first transmit beam of the plurality of transmit beams; and
   transmitting second signaling via a transmit beam corresponding to the first receive beam, the second signaling being transmitted during a transmission occasion configured for the first transmit beam, wherein the communication is based on the first receive beam.

5. The method of claim 4, wherein the communicating comprises communicating on sidelink channels with the second UE and a third UE based on the first transmit beam and the first receive beam, wherein transmission occasions of the sidelink channels are randomly selected.

6. The method of claim 4, wherein the communicating comprises communicating on a first sidelink channel with the second UE and on a second sidelink channel with a third UE, the first sidelink channel and the second sidelink channel identifying the second UE and the third UE, respectively.

7. The method of claim 1, further comprising:
   receiving, via a first receive beam, the first signaling transmitted using a first transmit beam of the plurality of transmit beams;
   receiving, via a second receive beam, the first signaling transmitted using a second transmit beam of the plurality of transmit beams;
   transmitting second signaling via a transmit beam corresponding to the first receive beam and during a transmission occasion configured for the first transmit beam; and
   transmitting third signaling via a transmit beam corresponding to the second receive beam and during a transmission occasion configured for the second transmit beam.

8. The method of claim 7, further comprising:
   communicating with the second UE based on the first receive beam; and
   communicating with the third UE based on the second receive beam.

9. The method of claim 1, wherein the first signaling is monitored for during a first DRX cycle of the DRX configuration, and wherein the first signaling is monitored via a receive beam used to receive signals during a previous DRX cycle of the DRX configuration.

10. The method of claim 1, wherein monitoring for the first signaling comprises:
    monitoring for the first signaling using a broad beam; and
    monitoring for the first signaling using a narrow beam if the first signaling is not received while monitoring using the broad beam.

11. A method for wireless communication by a first user-equipment (UE), comprising:
    transmitting first signaling to a second UE if the first UE has data to send to the second UE, the first signaling being transmitted using a plurality of transmit beams during a DRX cycle of a DRX configuration of the second UE;
    receiving an indication of one or more transmit beams of the plurality of transmit beams; and
    communicating in accordance with the received indication, wherein:
       the first signaling is transmitted to the second UE and a third UE;
       the first signaling transmitted to the second UE comprises a sequence indicating an identifier (ID) associated with the first UE and the second UE; and
       the first signaling transmitted to the third UE comprises a sequence indicating an ID associated with the first UE and the third UE.

12. The method of claim 11, wherein the first signaling transmitted using each of the plurality of transmit beams is monitored for by the second UE using one of a plurality of receive beams.

13. The method of claim 11, wherein the first signaling is transmitted during a beginning of an awake phase of the DRX cycle of the second UE.

14. The method of claim 11, further comprising transmitting the first signaling using a first transmit beam of the plurality of transmitted beams, wherein receiving the indication of the one or more transmit beams comprises receiving second signaling via a receive beam corresponding to the first transmit beam, wherein the communication is based on the first transmit beam.

15. The method of claim 14, further comprising randomly selecting transmission occasions to be used for the communication on sidelink channels with the second UE based on the first transmit beam.

16. The method of claim 14, wherein the communicating comprises communicating on a first sidelink channel with the second UE, the first sidelink channel identifying the first UE.

17. The method of claim 11, further comprising:
    transmitting the first signaling using a first transmit beam of the plurality of transmit beams; and transmitting the first signaling using a second transmit beam of the plurality of transmit beams, wherein receiving the indication of the one or more transmit beams comprises:
receiving second signaling via a receive beam corresponding to the first transmit beam; and
receiving the second signaling via a receive beam corresponding to the second transmit beam.

18. The method of claim 17, further comprising:
communicating with the second UE based on the first transmit beam; and
communicating with the third UE based on the second transmit beam.

19. An apparatus for wireless communication by a first user-equipment (UE), comprising:
a memory; and
one or more processors coupled to the memory, the memory and the one or more processors being configured to:
apply a discontinuous reception (DRX) configuration for the first UE;
monitor for first signaling from a second UE indicating that the second UE has data to send to the first UE, the first signaling being transmitted using a plurality of transmit beams during a DRX cycle of the DRX configuration;
select one or more transmit beams of the plurality of transmit beams based on the monitoring of the first signaling; and
communicate in accordance with the selection, wherein:
the first signaling is transmitted by the second UE and a third UE;
the first signaling transmitted from the second UE comprises a sequence indicating an identifier (ID) associated with the first UE and the second UE; and
the first signaling transmitted from the third UE comprises a sequence indicating an ID associated with the first UE and the third UE.

20. An apparatus for wireless communication by a first user-equipment (UE), comprising:
a memory; and
one or more processors coupled to the memory, the memory and the one or more processors being configured to:
transmit first signaling to a second UE if the first UE has data to send to the second UE, the first signaling being transmitted using a plurality of transmit beams during a DRX cycle of a DRX configuration of the second UE;
receive an indication of one or more transmit beams of the plurality of transmit beams; and
communicate in accordance with the received indication, wherein:
the first signaling is transmitted to the second UE and a third UE;
the first signaling transmitted to the second UE comprises a sequence indicating an identifier (ID) associated with the first UE and the second UE; and
the first signaling transmitted to the third UE comprises a sequence indicating an ID associated with the first UE and the third UE.

* * * * *